United States Patent
Kato et al.

(10) Patent No.: US 10,701,307 B2
(45) Date of Patent: Jun. 30, 2020

(54) IMAGE DATA OUTPUT DEVICE, IMAGE DATA OUTPUT METHOD, INTEGRATED CIRCUIT, AND IMAGE DISPLAY DEVICE

(71) Applicant: Sharp Kabushiki Kaisha, Sakai, Osaka (JP)

(72) Inventors: Katsuya Kato, Sakai (JP); Hideo Namba, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/541,887

(22) PCT Filed: Jan. 4, 2016

(86) PCT No.: PCT/JP2016/050039
§ 371 (c)(1),
(2) Date: Jul. 6, 2017

(87) PCT Pub. No.: WO2016/111263
PCT Pub. Date: Jul. 14, 2016

(65) Prior Publication Data
US 2018/0007311 A1    Jan. 4, 2018

(30) Foreign Application Priority Data
Jan. 7, 2015    (JP) .................. 2015-001282

(51) Int. Cl.
*H04N 7/01*    (2006.01)
*G09G 5/36*    (2006.01)
(Continued)

(52) U.S. Cl.
CPC ............. *H04N 7/013* (2013.01); *G09G 5/18* (2013.01); *G09G 5/36* (2013.01); *H04N 7/0127* (2013.01);
(Continued)

(58) Field of Classification Search
CPC ........ H04N 7/013; H04N 7/0135; H04N 7/08; H04N 5/57
See application file for complete search history.

(56) References Cited

U.S. PATENT DOCUMENTS

| 8,872,982 B2 | 10/2014 | Nishio et al. |
| 8,902,368 B2 | 12/2014 | Nio et al. |

(Continued)

FOREIGN PATENT DOCUMENTS

| JP | 2006-267303 A | 10/2006 |
| JP | 2011-071628 A | 4/2011 |

(Continued)

OTHER PUBLICATIONS

AMD, "White Paper | AMD Project Freesync", Mar. 2014.

*Primary Examiner* — Michael E Teitelbaum
(74) *Attorney, Agent, or Firm* — ScienBiziP, P.C.

(57) ABSTRACT

Provided are an image data output device, an image data output method, an image display device, and an integrated circuit that are possible to eliminate stutter by selecting a frame rate from a plurality of frame rate candidates. The image data output device that switches a frame rate of a generated image for each frame and outputs the image to an image display device includes an image generation unit that, on a basis of image generation time required to generate the image, changes the frame rate to one of a plurality of frame rates which are predetermined.

6 Claims, 7 Drawing Sheets

(51) Int. Cl.
  *G09G 5/18*    (2006.01)
  *G09G 3/34*    (2006.01)
  *H04N 5/57*    (2006.01)
  *H04N 7/08*    (2006.01)

(52) U.S. Cl.
  CPC ... *G09G 3/3406* (2013.01); *G09G 2310/0237* (2013.01); *G09G 2310/08* (2013.01); *G09G 2320/0261* (2013.01); *G09G 2320/10* (2013.01); *G09G 2340/0435* (2013.01); *G09G 2370/04* (2013.01); *H04N 5/57* (2013.01); *H04N 7/0135* (2013.01); *H04N 7/08* (2013.01)

(56) References Cited

U.S. PATENT DOCUMENTS

| | | | |
|---|---|---|---|
| 2003/0156639 A1* | 8/2003 | Liang | G09G 5/005 375/240.01 |
| 2009/0040373 A1* | 2/2009 | Lo | H04N 5/217 348/448 |
| 2014/0232940 A1 | 8/2014 | Nio et al. | |
| 2014/0267902 A1 | 9/2014 | Nishio et al. | |

FOREIGN PATENT DOCUMENTS

| | | |
|---|---|---|
| JP | 2012-049657 A | 3/2012 |
| JP | 2013-150103 A | 8/2013 |
| WO | 2013/076881 A1 | 5/2013 |
| WO | 2016/002063 A1 | 1/2016 |

\* cited by examiner

IMAGE DATA OUTPUT DEVICE, IMAGE DATA OUTPUT METHOD, INTEGRATED CIRCUIT, AND IMAGE DISPLAY DEVICE

TECHNICAL FIELD

The present invention relates to an image data output device, an image data output method, an integrated circuit, and an image display device.

BACKGROUND ART

In recent years, in accordance with progress in a video generation technique and the like, it is required that a fine image is generated in real time for a computer game and the like. In NPL 1, a technique for eliminating tearing or stutter (stuttering) which is caused in a case where image generation becomes late for refresh timing of a display due to an increase in a load of image generation is described. With a method of NPL 1, an image data output device controls the refresh timing of the display, and thereby tearing or stutter is able to be eliminated.

CITATION LIST

Non Patent Literature

NPL 1: AMD, "White Paper|AMD PROJECT FREESYNC," March, 2014.

SUMMARY OF INVENTION

Technical Problem

However, the method described in NPL 1 has a problem that image display time is different between frames and stutter is still caused in some cases. Moreover, it is difficult for an image display device side to know a frame rate in advance, so that there is a problem that processing for improving image quality performed by the image display device is limited.

The invention is made in view of such circumstances, and an object thereof is to provide an image data output device, an image data output method, an image display device, and an integrated circuit that are capable of stably eliminating stutter.

Solution to Problem

In order to solve the above-described problems, configurations of an image data output device, an image data output method, an image display device, and an integrated circuit according to the invention are as follows.

(1) An image data output device according to an aspect of the invention is an image data output device that switches a frame rate of a generated image for each frame and outputs the image to an image display device. The image data output device includes an image generation unit that, on a basis of image generation time required to generate the image, changes the frame rate to one of a plurality of frame rates which are predetermined.

(2) The image data output device of the invention outputs the image to the image display device with a horizontal blanking interval and a vertical blanking interval and adjusts either or both lengths of the horizontal blanking interval and the vertical blanking interval for each frame to thereby switch the frame rate.

(3) In the image data output device of the invention, the image generation unit notifies the image display device of the frame rate of each frame.

(4) In the image data output device of the invention, a control unit that determines a low frame rate threshold on a basis of which the frame rate is switched and a low frame rate candidate that has at least one element is included. The image generation unit changes the frame rate to one element of the low frame rate candidate, in a case where an image generation frequency that is an inverse number of the image generation time falls below the low frame rate threshold.

(5) In the image data output device of the invention, the control unit determines the low frame rate threshold and the low frame rate candidate on a basis of information received from the image display device.

(6) In the image data output device of the invention, the image generation unit gradually changes the frame rate by spending a prescribed number of frames.

(7) In the image data output device of the invention, the image generation unit outputs, in a frame in which the frame rate is determined to be reduced, the image immediately after the image is generated.

(8) In the image data output device of the invention, the image generation unit changes the frame rate to a maximum element of the low frame rate candidate, which does not fall below the image generation frequency.

(9) In the image data output device of the invention, the image generation unit includes a frame-rate-maintaining frame number. In a case where the frame rate is changed to one element of the low frame rate candidate, the image generation unit maintains the changed frame rate for the frame-rate-maintaining frame number as long as there is no frame in which the image generation frequency falls below the changed frame rate.

(10) In the image data output device of the invention, the control unit determines a standard frame rate, and the image generation unit outputs the image immediately after the image is generated, in a case where the frame rate is the standard frame rate and the image generation frequency is equal to or more than the low frame rate threshold.

(11) In the image data output device of the invention, the control unit sets the standard frame rate as a maximum refresh rate of the image display device.

(12) In the image data output device of the invention, the image generation unit, in a case where a frame rate increasing condition that there are the prescribed number of continuous frames in each of which an element of the low frame rate candidate is larger than the image generation frequency is satisfied, changes the frame rate to a maximum element of the frame rate candidate, which satisfies the frame rate increasing condition.

(13) In the image data output device of the invention, the image generation unit changes the frame rate to the standard frame rate, in a case where the low frame rate threshold satisfies the frame rate increasing condition.

(14) In the image data output device of the invention, the image generation unit outputs the image immediately after the image is generated, in a case where the image generation frequency falls below a minimum value of the frame rate candidate.

(15) In the image data output device of the invention, the image generation unit outputs an image of a preceding frame, in a case where the image generation frequency falls below a minimum value of the frame rate candidate.

(16) An image data output method according to another aspect of the invention is an image data output method of switching a frame rate of a generated image for each frame and outputting the image to an image display device. The image data output method includes an image generation step of, on a basis of image generation time required to generate the image, changing the frame rate to one of a plurality of frame rates which are predetermined.

(17) An integrated circuit of an image data output device according to further aspect of the invention is an integrated circuit installed in an image data output device that switches a frame rate of a generated image for each frame and outputs the image to an image display device. The integrated circuit includes image generation means that, on a basis of image generation time required to generate the image, changes the frame rate to one of a plurality of frame rates which are predetermined.

(18) An image display device according to further another aspect of the invention is an image display device that receives, from an image data output device, an image frame rates of which are different by frames and the frame rates of the image. The frame rates that are capable of being subjected to processing as the frame rates values of which are different by frames are notified to the image data output device.

(19) The image display device of the invention performs the notification by using Extended display identification data (EDID) to be transmitted to the image data output device.

(20) The image display device of the invention performs black insertion during a frame period in which the image is displayed, on a basis of the received frame rates of the image.

(21) The image display device of the invention determines brightness of the image on the basis of the received frame rates of the image.

(22) The image display device of the invention performs frame interpolation between frames on a basis of the image and the received frame rates of the image.

Advantageous Effects of Invention

According to the invention, an image data output device is able to generate a video in which stutter is eliminated.

DESCRIPTION OF EMBODIMENTS

First Embodiment

Figure 1:
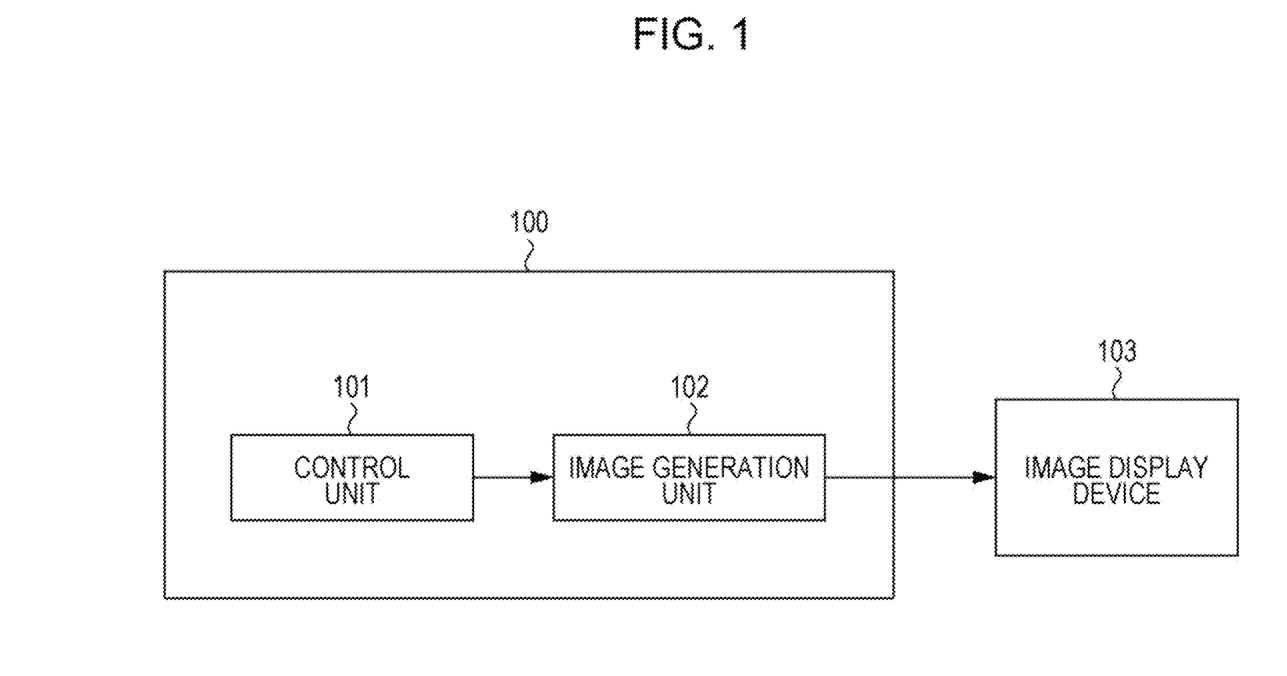
FIG. 1 is a schematic block diagram illustrating configurations of an image data output device and an image display device according to a first embodiment of the invention.

Hereinafter, a first embodiment of the invention will be described. FIG. 1 is a schematic block diagram illustrating a configuration of an image data output device (source) 100. In the figure, the image data output device 100 is configured to include a control unit 101 and an image generation unit 102. In addition, an image display device (sink, display) 103 is illustrated together in FIG. 1. Examples of the image data output device 100 include a personal computer (PC), a stationary game machine, a reproduction device for a disk in which a video is recorded, a set-top box which is adaptable to cable television or satellite broadcasting, and the like. Moreover, the image data output device 100 may be configured to include the image display device 103, for example, such as a portable game machine, a smartphone, or a tablet.

The control unit 101 instructs the image generation unit 102 to generate an image. The control unit 101 outputs, to the image generation unit 102, a parameter of an image which is to be displayed in a next frame. The parameter of the image here is information of 3D coordinates, a shape, a color and the like of an object to be displayed, which is necessary for image generation. Note that, the image generation unit 102 may generate the parameter of the image. Note that, the control unit 101 is not only able to cause the image generation unit 102 to operate but to control various operations of the image data output device 100.

The image generation unit 102 generates the image on the basis of the parameter input from the control unit 101, and outputs the image to the image display device 103. At this time, the image generation unit 102 outputs the generated image so that the image display device 103 is able to display a moving image at a frame rate of a prescribed number. This is able to be realized when a horizontal blanking interval (HBI) or a vertical blanking interval (VBI) of a signal output by the image generation unit 102 is set to be variable. For example, in a case where the image data output device 100 notifies the image display device 103 of the total number of horizontal pixels, the total number of vertical lines, an active width, and an active height, the image data output device 100 notifies, to the image display device 103, that the total number of horizontal pixels or the total number of vertical lines is variable. It is thereby possible to set the HBI or the VBI to be variable. For example, by setting a value of the total number of horizontal pixels or the total number of vertical lines, which is notified to the image display device 103 by the image data output device 100, to be an invalid value, it is possible to indicate that the HBI or the VBI is variable. As the invalid value, 0 may be used, for example. Note that, the notification of the total number of horizontal pixels, the total number of vertical lines, the active width, and the active height may be performed by using Main Stream Attribute (MSA).

The image generation unit 102 is able to receive control information from the image display device 103, and acquire information of maximum resolution, a maximum refresh rate, and the like with which the image display device 103 is able to operate. On the basis of the information, the control unit 101 is able to determine a standard frame rate F of an image which is to be transmitted to the image display device 103 by the image generation unit 102. For example, in a case where the maximum refresh rate of the image display device 103 is 60 Hz, the control unit 101 is able to set F to be 60 Hz. For example, on the basis of a request of an application to be operated, the control unit 101 is able to set F within a range not exceeding the maximum refresh rate of the image display device 103.

The image display device 103 displays images input from the image generation unit 102 one after another to realize display of a moving image. For example, the image display device 103 displays the images input from the image generation unit 102 at timing of the VBI, and is thereby able to realize a moving image at a frame rate of a prescribed number.

Connection between the image generation unit 102 and the image display device 103 is able to be realized, for example, with the use of cable terminals of High-Definition Multimedia Interface (registered trademark) (HDMI), DisplayPort, Digital Visual Interface (DVI), or the like. In a case where the image generation unit 102 and the image display device 103 are included in the same hardware, for example, embedded DisplayPort (eDP), Internal DisplayPort (iDP), or the like may be used for the connection between the image generation unit 102 and the image display device 103. Note that, the connection between the image generation unit 102 and the image display device 103 may be wireless connection.

Figure 2:
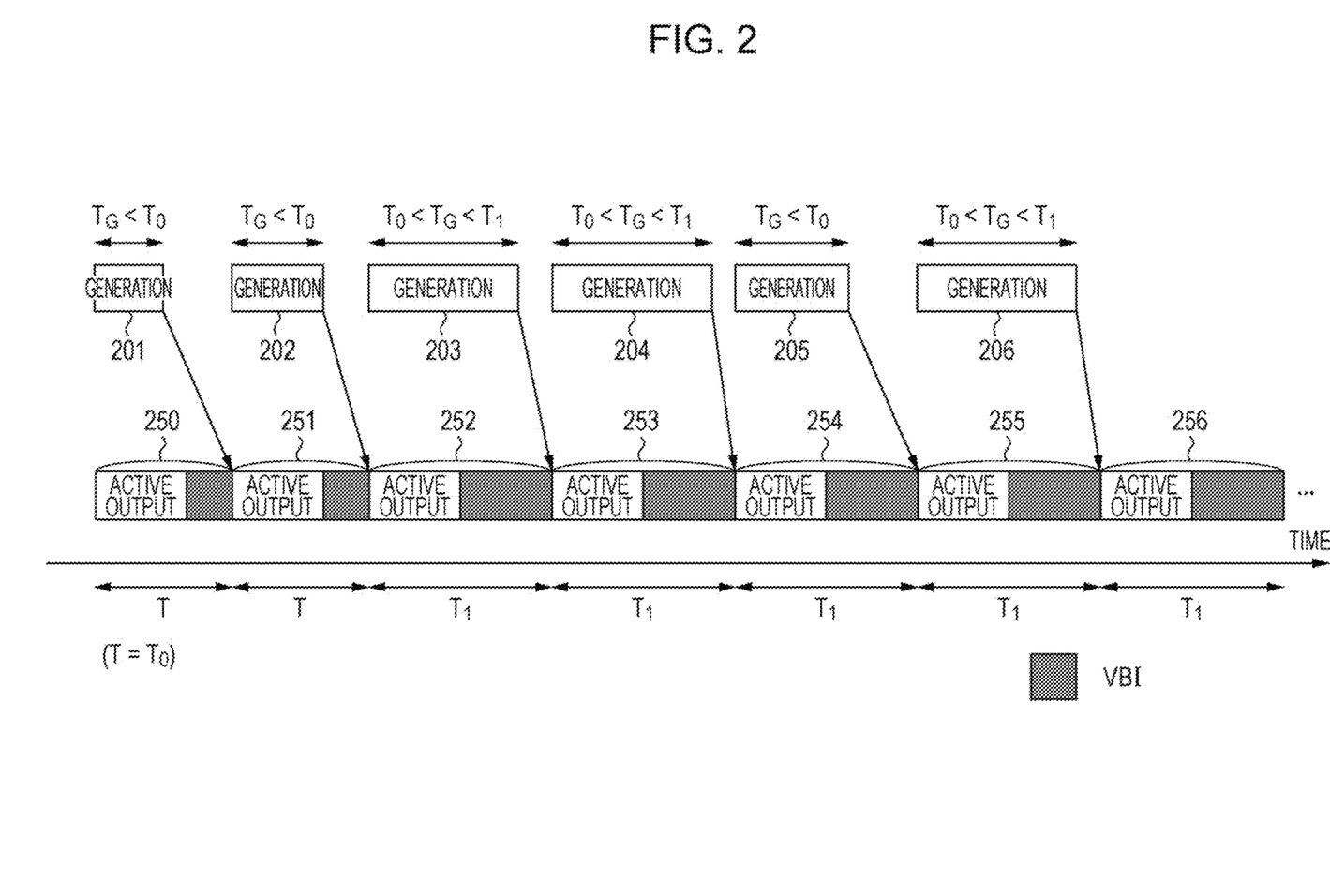
FIG. 2 is a view illustrating an example of processing of the image data output device in the first embodiment of the invention.

An operation of the image generation unit 102 in FIG. 1 will be described by using FIG. 2. T denotes an inverse number of the standard frame rate F. Image generation time of the image generation unit 102 is represented with 201 to 206. In 203, 204, and 206, time required for image generation exceeds T. Output of a generated image is started at timing when a VBI ends. The image generation unit 102 is able to output information of blanking end (BE) to the image display device 103 at the timing when the VBI ends. Moreover, simultaneously with start of outputting the image, generation of an image of a next frame is started. For example, the image generation unit 102 is able to notify the control unit 101 of information indicating that the VBI ends. Thereby, the control unit 101 is able to know timing to start generation of the image of the next frame. An image generated in output generation time x is output at frame output time x+50. The frame output time is composed of active output time and a VBI. The active output time indicates time from start to completion of output of a generated image. In FIG. 2, the active output time includes a plurality of HBIs.

The image generation unit 102 has a standard frame rate mode (first frame rate mode) for operating at a standard frame rate and a low frame rate mode (second frame rate mode) for operating at a low frame rate. The image generation unit 102 has a low frame rate threshold on the basis of which whether or not to change a mode to the low frame rate mode is determined. The control unit 101 is able to determine the low frame rate threshold. Moreover, the image generation unit 102 has at least one low frame rate candidate. It is set that a k-th low frame rate candidate is $F_k$ (k is an integer which is equal to or more than 1). In addition, it is set that $F_0$ denotes the low frame rate threshold. For example, it is possible to set that ($F_0$, $F_1$, $F_2$, and $F_3$) to be (60 Hz, 48 Hz, 36 Hz, and 24 Hz). $F_k$>$F_{k+1}$ is provided. The control unit 101 may determine these values of $F_k$. In addition, $T_k$ is set as an inverse number of $F_k$.

The image generation unit 102 operates in the standard frame rate mode as long as image generation time $T_G$ does not exceed $T_0$. In the standard frame rate mode, in a case where the image generation time $T_G$ satisfies T<$T_G$≤$T_0$, a generated image is immediately output to the image display device 103. In a case of $T_G$<T, a generated image is output after waiting for (T−$T_G$) after image generation is ended. Note that, comparison may be made for frequencies by using an inverse number $F_G$ of the image generation time $T_G$. In this case, T<$T_G$≤$T_0$ described above is changed to F>$F_G$≥$F_0$, and $T_G$<T is changed to $F_G$>F. This will be applied similarly hereinafter.

FIG. 2 illustrates an example of T=$T_0$, in which the image generation unit 102 operates in the standard frame rate mode at first. Since image generation time $T_G$ of 201 satisfies $T_G$<$T_0$($F_G$>$F_0$), the standard frame rate mode is continued. In this case, the image generation unit 102 starts active output of an image generated in the image generation time 201 so that frame output time 250 becomes T.

Similarly, since image generation time $T_G$ of 202 satisfies $T_G$<$T_0$($F_G$>$F_0$), the image generation unit 102 starts active output of an image generated in the image generation time 202 so that frame output time 251 becomes T.

In a case where image generation time $T_G$ exceeds $T_0$, the image generation unit 102 shifts to the low frame rate mode. In the low frame rate mode, the image generation unit 102 selects minimum $T_k$ with which $T_G$<$T_k$ is satisfied, and sets $F_k$, which corresponds thereto, as a new frame rate. This means that maximum $F_k$ with which $F_G$>$F_k$ is satisfied is selected. In FIG. 2, since image generation time $T_G$ of 203 satisfies $T_G$>$T_0$ ($F_G$<$T_0$), the image generation unit 102 shifts to the low frame rate mode. Since the image generation time $T_G$ of 203 satisfies $T_G$<$T_1$ ($F_G$>$F_1$), the image generation unit 102 sets a frame rate to be $F_1$. The image generation unit 102 starts active output of an image generated in the image generation time 203 so that frame output time 252 becomes $T_1$.

Image generation time $T_G$ of 204 satisfies $T_0$<$T_G$<$T_1$ ($F_0$>$F_G$>$F_1$). Accordingly, the image generation unit 102 continues the low frame rate mode in which the frame rate is set to be $F_1$. The image generation unit 102 starts active output of an image generated in the image generation time 204 so that frame output time 253 becomes $T_1$.

The image generation unit 102 continues the low frame rate mode for a while. How to return to the standard frame rate mode will be described below. Image generation time $T_G$ of 205 satisfies $T_G$<$T_0$ ($F_G$>$F_0$), but the low frame rate mode is maintained. Accordingly, the image generation unit 102 starts active output of an image generated in the image generation time 205 so that frame output time 254 becomes $T_1$.

Image generation time $T_G$ of 206 satisfies $T_0$<$T_G$<$T_1$ ($F_0$>$F_G$>$F_1$). Accordingly, the image generation unit 102 continues the low frame rate mode in which the frame rate is set to be $F_1$. The image generation unit 102 starts active output of an image generated in the image generation time 206 so that frame output time 255 becomes $T_1$.

In this manner, in a case where image generation time $T_G$ becomes large, the image generation unit 102 does not output an image immediately, but selects a frame rate from a low frame rate candidate, which is set in advance, so that a length of image display time in the image display device 103 becomes constant. Thereby, it is possible to reduce an influence of stutter.

In a case where the image generation time $T_G$ becomes larger than an inverse number of a current frame rate (in a case where an image generation frequency $F_G$ becomes smaller than the current frame rate), even when the low frame rate mode is continued, the frame rate is changed to a smaller frame rate.

Next, how to return to the standard frame rate mode from the low frame rate mode will be described. The image generation unit 102 has a frame-rate-maintaining frame number N in a low frame rate. The image generation unit 102 operates so as to maintain a current frame rate for N frames after a change to the low frame rate mode. In a case where there are N continuous frames in each of which image generation time $T_G$ satisfies $T_G$≤$T_0$ ($F_G$≥$F_0$), the image generation unit 102 returns to the standard frame rate mode.

Figure 3:
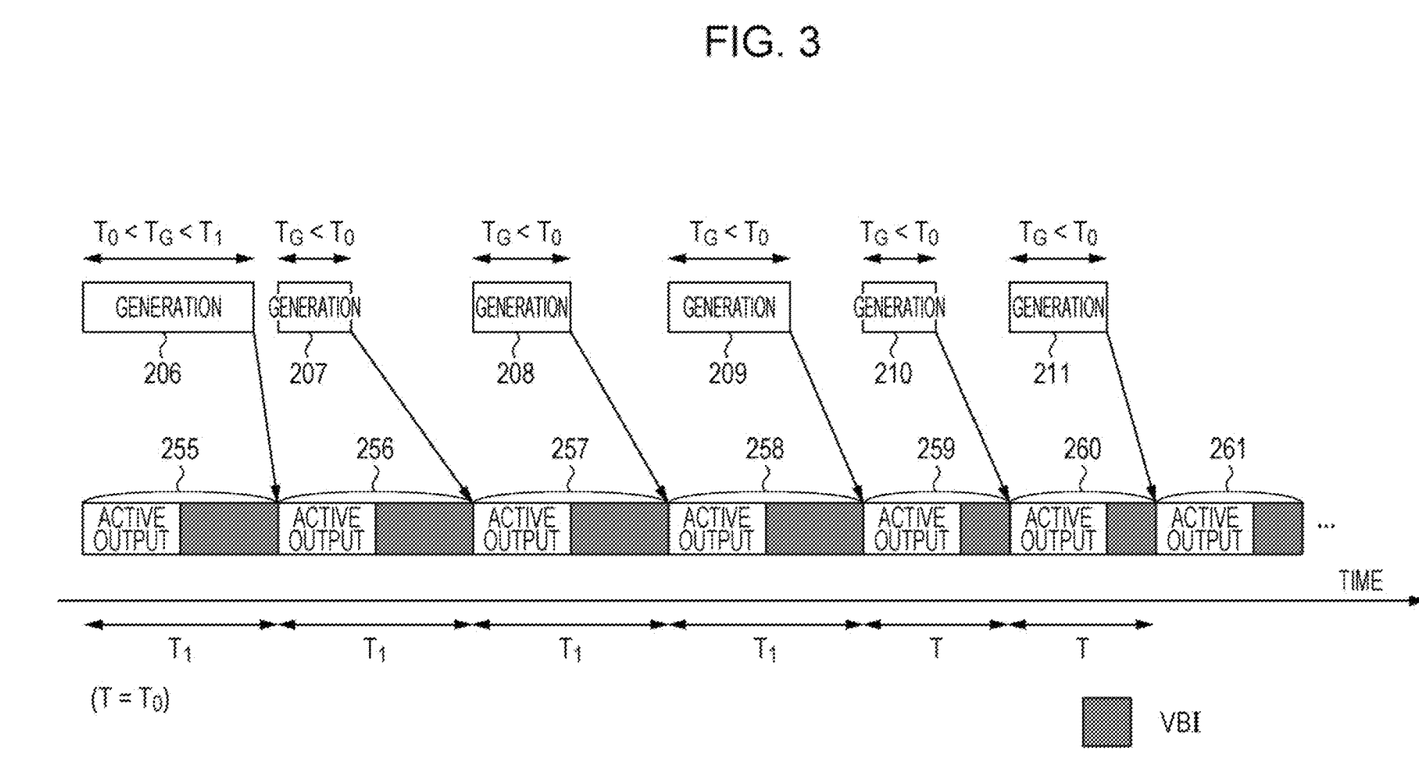
FIG. 3 is a view illustrating an example of the processing of the image data output device in the first embodiment of the invention.

FIG. 3 illustrates a continuation of FIG. 2. In addition, N=4 is provided. In four continuous frames from 207 to 210, $T_G<T_0$ ($F_G>F_0$) is satisfied, so that a returning operation to the standard frame rate mode is performed. Specifically, active output of an image generated in image generation time 210 is started so that frame output time 259 becomes T. However, in a case of $T<T_G \le T_0$ ($F>F_G \ge F_0$), the image generated in 210 is immediately output to the image display device 103.

A rise of the frame rate, which is described above, is able to be performed also in the low frame rate mode. For example, in a case where, during an operation at a frame rate $F_3$, there are N continuous frames in each of which $T_G \le T_2$ ($F_G \ge F_2$) is satisfied, the frame rate is changed to $F_2$.

Note that, a frame rate is able to be changed to a maximum low frame rate candidate, which satisfies a condition, or the standard frame rate. For example, in a case where, during the operation at the frame rate $F_3$, there are N continuous frames in each of which $T_G \le T_1$ ($F_G \ge F_1$) is satisfied, the frame rate is changed to $F_1$. In a case where there are N continuous frames in each of which $T_G \le T_0$ ($F_G \ge F_0$) is satisfied, the frame rate is changed to the standard frame rate F.

<As to Operation of Image Data Output Device 100>

Figure 4:
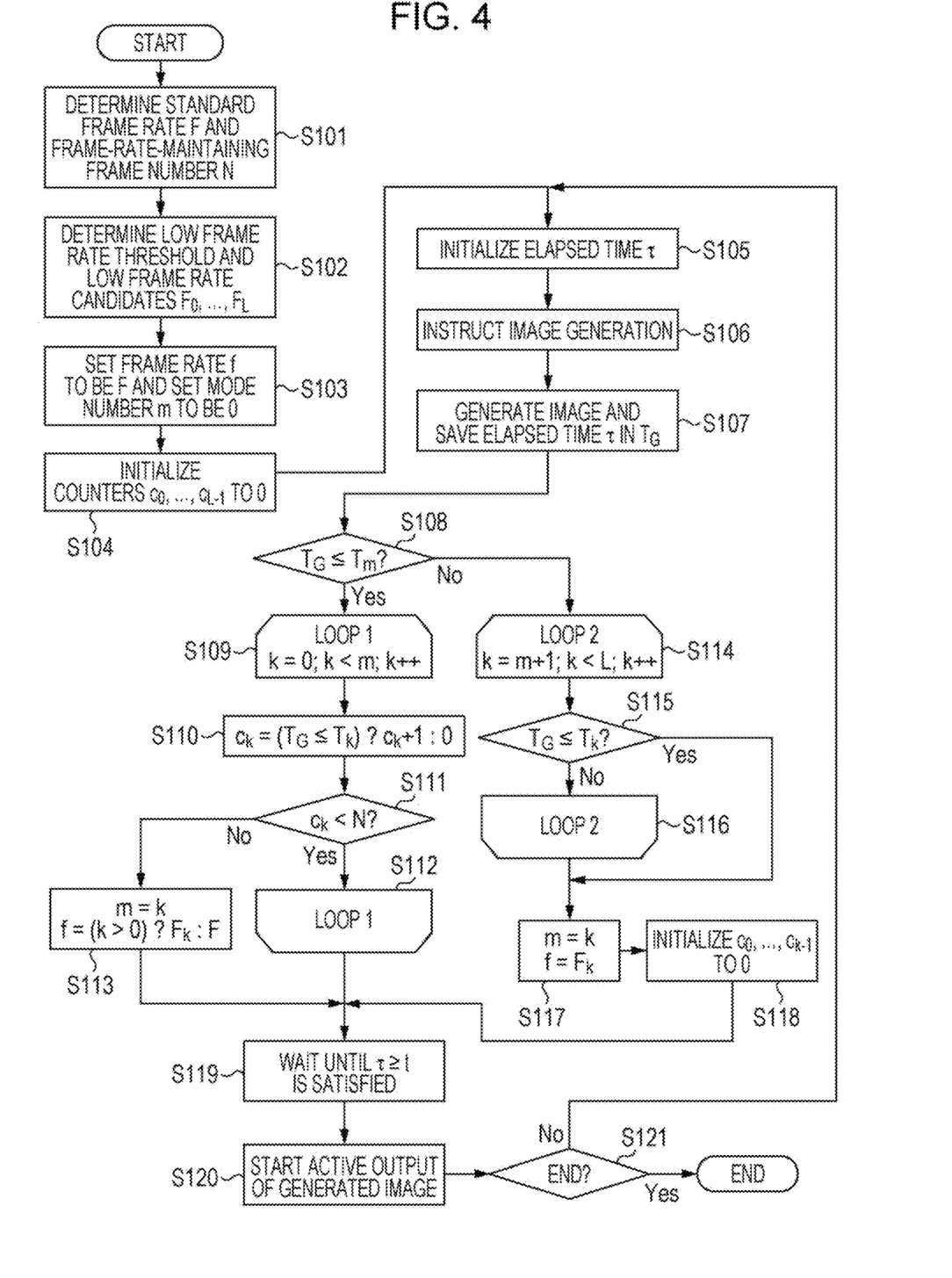
FIG. 4 is a flowchart illustrating an operation of the image data output device in the first embodiment of the invention.

FIG. 4 is a flowchart illustrating an operation of the image data output device 100.

(Step S101) The image data output device 100 acquires information of a maximum refresh rate and the like from the image display device 103. The control unit 101 determines the standard frame rate F on the basis of the acquired information of the maximum refresh rate and the like. Moreover the control unit 101 determines the frame-rate-maintaining frame number N. The control unit 101 outputs F and N to the image generation unit 102. Thereafter, the procedure moves to step S102.

(Step S102) The control unit 101 determines the low frame rate threshold $F_0$ and low frame rate candidates $F_1, \ldots, F_L$. L represents the number of low frame rate candidates. The low frame rate threshold and the low frame rate candidates are set so as to satisfy $F_0 > \ldots > F_L$. The control unit 101 outputs the low frame rate threshold and the low frame rate candidates to the image generation unit 102. Thereafter, the procedure moves to step S103.

(Step S103) The image generation unit 102 sets a frame rate f to be F. In FIG. 4, t represents an inverse number of f. Moreover, the image generation unit 102 sets a mode number m to be 0. Here, the mode number represents which frame rate is used. A mode number 0 represents the standard frame rate mode in which the frame rate f is F. In a case of m>0, the mode number m represents the low frame rate mode in which the frame rate f is $F_m$. Accordingly, a change of the mode number means a change of the frame rate. Thereafter, the procedure moves to step S104.

(Step S104) The image generation unit 102 initializes counters $c_0, \ldots, c_{L-1}$, with which whether or not to change the mode number is judged, to 0. Thereafter, the procedure moves to step S105.

(Step S105) Elapsed time T is initialized. The elapsed time T saves elapsed time from a time point of initialization. Timing of initialization of T and an end of one VBI may be the same. Thereafter, the procedure moves to step S106.

(Step S106) The control unit 101 instructs the image generation unit 102 to generate an image, and outputs a parameter of the image. Thereafter, the procedure moves to step S107.

(Step S107) The image generation unit 102 generates the image on the basis of the parameter of the image obtained at step S106. Moreover, the image generation unit 102 saves elapsed time T of a time point, at which the image generation is finished, in $T_G$. This means that image generation time of a current frame is saved in $T_G$. Calculation of $F_G$ which is the inverse number of $T_G$ may be performed. Thereafter, the procedure moves to step S108.

(Step S108) In a case where the image generation time $T_G$ is equal to or less than $T_m$ which is an inverse number of $F_m$ (in a case where $F_G$ is equal to or more than $F_m$), the image generation unit 102 judges that reduction of the frame rate is not necessary, and the procedure moves to step S109. In a case where the condition is not satisfied, the procedure moves to step S114.

(Step S109) Step S109 is a starting point of a loop structure which ends at step S112. In a case where the preceding step is S108, a variable k is initialized to 0. In a case where the preceding step is S112, the variable k increases by 1. After the aforementioned processing for the variable k is performed, when k is smaller than m, the procedure moves to step S110. In a case where the condition is not satisfied, the procedure jumps to step S112.

(Step S110) In a case where the image generation time $T_G$ is equal to or less than $T_k$ (in a case where $F_G$ is equal to or more than $F_k$), the counter $c_k$ increases by 1. In a case where the condition is not satisfied, $c_k$ is initialized to 0. Thereafter, the procedure moves to step S111.

(Step S111) In a case where the counter $c_k$ is smaller than N, the procedure moves to step S112. In a case where the condition is not satisfied, the procedure moves to step S113.

(Step S112) In a case where the preceding step is S111, the procedure jumps to step S109. In a case where the preceding step is S109, the procedure moves to step S119.

(Step S113) The mode number m is changed to k. In a case where k is larger than 0, the frame rate f is changed to $F_k$. In a case where the condition is not satisfied, the frame rate f is changed to the standard frame rate F. With this step, the frame rate increases. Thereafter, the procedure moves to step S119.

(Step S114) Step S114 is a starting point of a loop structure which ends at step S116. In a case where the preceding step is S108, the variable k is initialized to m+1. In a case where the preceding step is S116, the variable k increases by 1. After the aforementioned processing for the variable k is performed, when k is smaller than L, the procedure moves to step S115. In a case where the condition is not satisfied, the procedure jumps to step S116.

(Step S115) In a case where the image generation time $T_G$ is equal to or less than $T_k$ (in a case where $F_G$ is equal to or more than $F_k$), the procedure moves to step S117. In a case where the condition is not satisfied, the procedure moves to step S116.

(Step S116) In a case where the preceding step is S115, the procedure jumps to step S114. In a case where the preceding step is S114, the procedure moves to step S117.

(Step S117) The mode number m is changed to k. The frame rate f is changed to $F_k$. With this step, the frame rate decreases. Thereafter, the procedure moves to step S118.

(Step S118) The counters $c_0, \ldots, c_{k-1}$ are initialized to 0. Note that, $c_k, \ldots, c_{L-1}$ may be initialized. Thereafter, the procedure moves to step S119.

(Step S119) The image generation unit 102 waits until the elapsed time T becomes t or more, which is the inverse number of the frame rate f. In a case where the condition is satisfied, the image generation unit 102 does not wait. Thereafter, the procedure moves to step S120.

(Step S120) The image generation unit 102 starts active output of the generated image to the image display device 103. Thereafter, the procedure moves to step S121.

(Step S121) End determination of the image data output device 100 is performed. For example, in a case where the image data output device 100 is shut down, it is possible to make a judgment as an end. In a case where judgment is made as the end, the image data output device 100 ends the operation. In a case where judgment is not made as the end, the procedure moves to step S105.

In this manner, according to the present embodiment, in a case where image generation time exceeds the low frame rate threshold, the image data output device 100 performs selection from an element of a low frame rate candidate. In a case where the frame rate is lowered, by maintaining the frame rate in a plurality of frames, it is possible to prevent generation of stutter in a moving image displayed on the image display device 103.

A generated image may be immediately output in a frame in which the frame rate is judged to be lowered. This means that the active output of the image generated in 203 of FIG. 2 is started immediately after the generation. Thereby, it is possible to smoothly change the frame rate.

The change of the frame rate may not be performed immediately, and the frame rate may be changed by spending several frames so as to become close to a target frame rate little by little. For example, a change from 48 Hz to 60 Hz may be performed by linearly and gradually changing the frame rate to 48 Hz, 51 Hz, 54 Hz, 57 Hz, and 60 Hz. In such a manner, it is possible to smoothly change the frame rate.

The image display device 103 may notify the image data output device of a minimum frame rate. The control unit 101 may set the minimum frame rate as a minimum value of the low frame rate candidate.

The low frame rate threshold may be 60 Hz or 59.94 (60/1.001) Hz. Since this value is a refresh rate which is adopted in many displays, it is possible to make the low frame rate threshold versatile.

The low frame rate threshold may be a maximum refresh rate of the image display device 103.

The standard frame rate may be the maximum refresh rate of the image display device 103.

In a case where the image generation time falls below the minimum value of the low frame rate candidate, an image of a preceding frame, which is saved in a memory, may be output without waiting for completion of image generation.

Note that, though a case where the image generation unit 102 changes the frame rate on the basis of the image generation time has been described in the aforementioned first embodiment, the control unit 101 may cause the image generation unit 102 to change the frame rate. This is able to be realized, for example, when the control unit 101 changes the standard frame rate and the low frame rate threshold. In this manner, for example, in a case where an application to use the control unit 101 has a large load of processing including image generation, the control unit 101 is able to stably change the frame rate. The image generation unit 102 may use the method of changing the frame rate, which has been described in the aforementioned first embodiment, in a frame whose image generation time is larger than an inverse number of a frame rate designated by the control unit 101. In the frame whose image generation time is larger than the inverse number of the frame rate designated by the control unit 101, the image generation unit 102 may output a generated image soon after the image generation is finished.

Second Embodiment

Hereinafter, a second embodiment of the invention will be described with reference to drawings. In the first embodiment, the image data output device 100 outputs an image by using one of a plurality of predetermined frame rates on the basis of image generation time, and thereby reduces stutter to be generated in the image display device 103. In the present embodiment, a method in which an image data output device notifies an image display device of a frame rate of an image to be output will be described.

Figure 5:
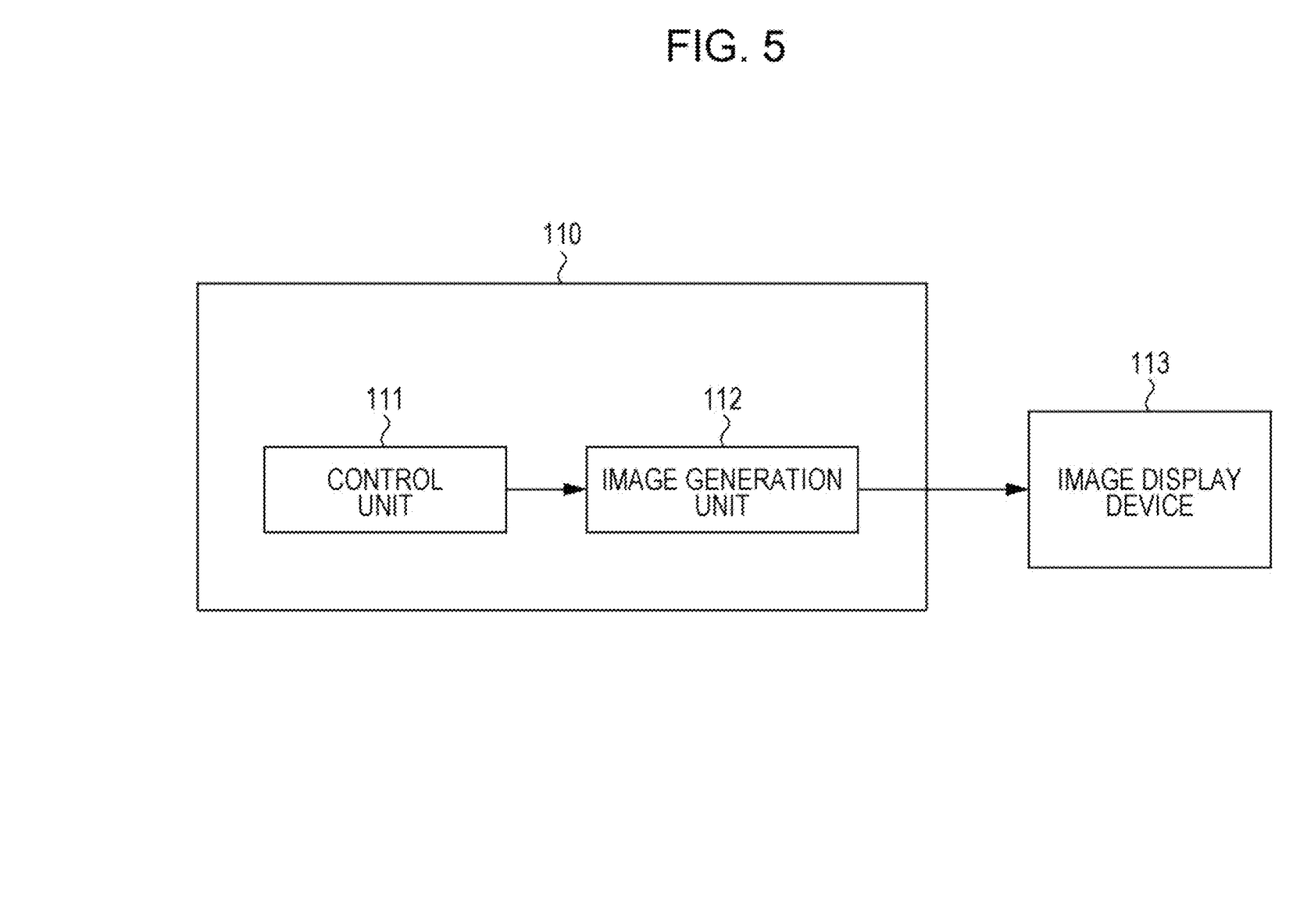
FIG. 5 is a schematic block diagram illustrating configurations of an image data output device and an image display device according to a second embodiment of the invention.

FIG. 5 is a schematic block diagram illustrating a configuration of an image data output device 110 according to the second embodiment of the invention. In this figure, the image data output device 110 is configured to include a control unit 111 and an image generation unit 112. In addition, an image display device 113 is illustrated in FIG. 5 together.

The control unit 111 is able to determine a standard frame rate, a low frame rate threshold, and a low frame rate candidate on the basis of information notified from the image display device 113. For example, in a case where there is a limitation to frame rates at which the image display device 113 is able to execute black insertion, which will be described below, when the standard frame rate, the low frame rate threshold, and the low frame rate candidate with which the frame rates are able to be realized are set, the image display device 113 is able to realize black insertion. For example, the image display device 113 is able to include a frame rate (desired frame rate), at which the image display device 113 is able to perform processing, into Extended display identification data (EDID) to be transmitted to the image data output device 110. It is possible to set a bit included in the EDID to be a flag of one frame rate. Moreover, the image display device 113 is able to give notification to the image data output device 110 by using the fact that a specific frame rate is desired. It is possible to use a bit, a version number, or the like, each of which is included in the EDID, as a flag as to whether or not the image display device 113 desires a specific frame rate. The image data output device 110 is able to determine the standard frame rate, the low frame rate threshold, and the low frame rate candidate on the basis of information of a frame rate, which is included in the EDID. The image data output device 110 is able to notify, to the image display device 113, that only the desired frame rate which has been notified is used.

Functions of the control unit 111 other than the above are the same as those of the control unit 101 (FIG. 1).

In addition to the function included in the image generation unit 102 (FIG. 1), the image generation unit 112 includes a function of notifying the image display device 113 of a frame rate (instant frame rate) of a generated image. Information to be notified may not be a frame rate itself. For example, a certain integer may correspond to a certain frame rate, and the integer may be notified.

Information other than information of an active image, such as a control signal transmitted by the image generation unit 112 during an HBI or a VBI, may include a frame rate to be notified.

In addition to the function included in the image display device 103 (FIG. 1), the image display device 113 may include a function of performing black insertion. With back insertion, it is possible to improve moving image display performance. For example, in a case where the image display device 113 is a liquid crystal display, when a backlight is extinguished, black insertion is able to be realized. Timing of extinguishing the backlight is set to be timing at which response of a liquid crystal starts, so that an image in a response process of the liquid crystal is prevented from being viewed, thus making it possible to further improve a sense of resolution of a moving image.

When black insertion is performed at regular intervals, it is possible to improve the sense of resolution of a moving image. Moreover, when black insertion is performed in a frequency which is an integer multiple of a frame rate, it is possible to prevent stutter from being generated. For example, with respect to a moving image at a frame rate of 24 Hz, it is possible to extinguish the backlight at 96 Hz or 144 Hz. With respect to a moving image at a frame rate of 60 Hz, it is possible to extinguish the backlight at 120 Hz. Backlight extinguishment using the above-described two frequencies is adopted in many existing displays. For example, when it is set that the low frame rate threshold used by the image generation unit 112 is 60 Hz and low frame rate candidates are 36 Hz and 24 Hz, it is possible to make repeated use of an existing backlight control circuit which includes a function of extinguishing the backlight. At this time, it is possible to set the standard frame rate to be 60 Hz and limit frame rates, at which an operation is performed, to three of 60 Hz, 36 Hz, and 24 Hz. In a case where a frame rate is 60 Hz, it is possible to perform backlight extinguishment at 120 Hz, and, in a case where the frame rate is 36 Hz or 24 Hz, it is possible to perform backlight extinguishment at 144 Hz.

Figure 6:
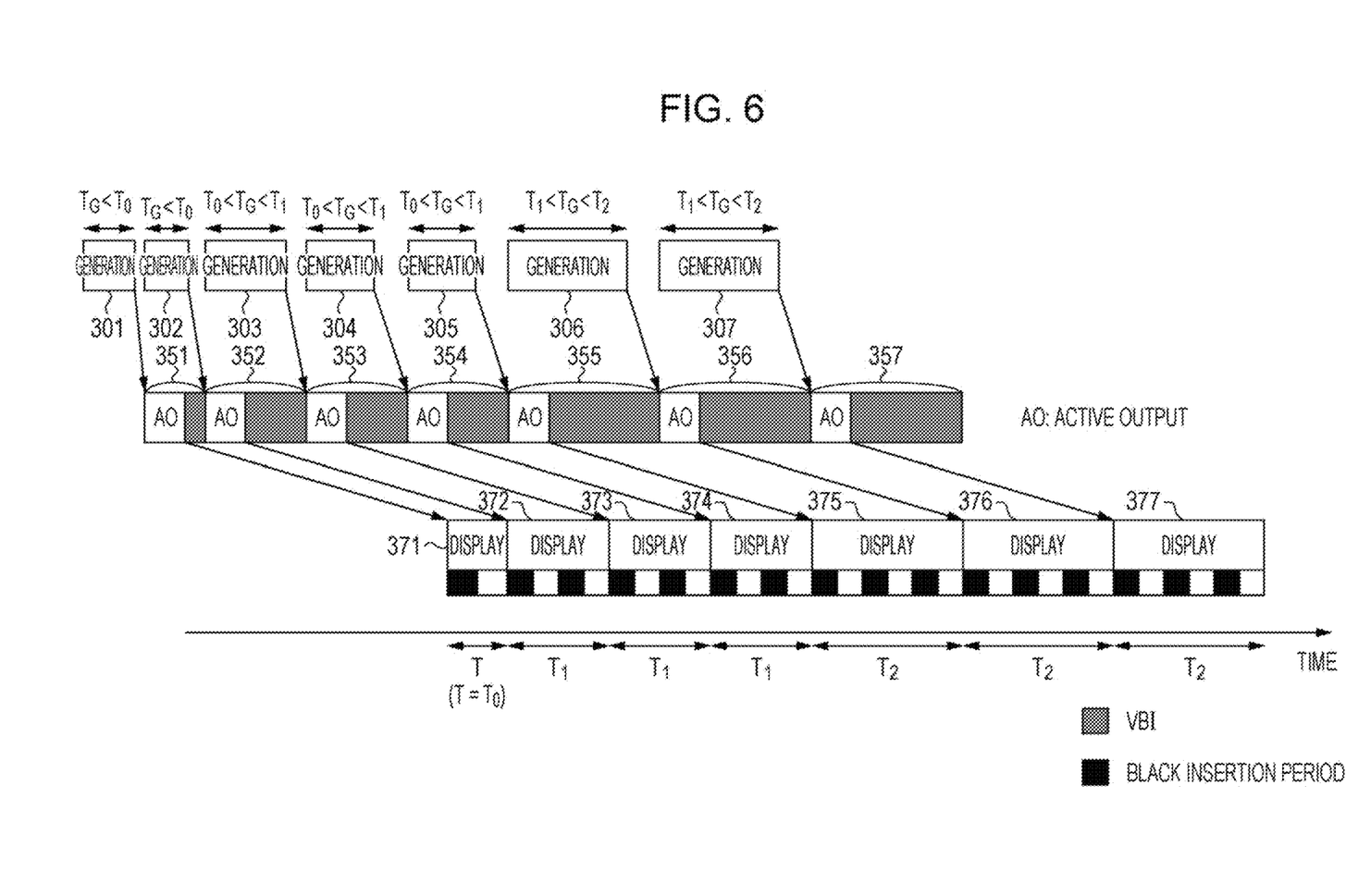
FIG. 6 is a view illustrating an example of processing of the image data output device and the image display device in the second embodiment of the invention.

FIG. 6 illustrates an example of a relation between image generation and output in the present embodiment. Similarly to FIG. 2, $T=T_0$ is provided. AO stands for active output. Similarly to FIG. 2, active output includes a plurality of HBIs in FIG. 6. Similarly to FIG. 2, an image generated in image generation time x is output at frame output time x+50. Moreover, the image generated in the image generation time x is displayed on the image display device 113 at image display time x+70. Black quadrilaterals and white ones in a lower side of image display time represent OFF and ON of the backlight, respectively. In the present embodiment, the image generation unit 112 outputs, with a generated image, a frame rate of the generated image to the image display device 113. The image display device 113 is able to perform black insertion by using the frame rate which has been input. For example, information to be output at frame output time x is able to include a frame rate to which frame output time x−1 corresponds. By displaying an image which is received at certain frame output time so as to be delayed for at least frame time of a minimum low frame rate candidate, the image display device 113 is able to realize black insertion using a frame rate which has been received. Note that, information output at a certain frame rate output time may include a frame rate of frame output time in several frames before. In such a case, an image received at the certain frame output time is able to be displayed so as to be delayed more.

In FIG. 6, 301 and 302, 303 to 305, and 306 and 307 satisfy $T_G<T_0$, $T_0<T_G<T_1$, and $T_1<T_G<T_2$, respectively. At this time, 351, 352 to 354, and 355 to 357 becomes T, $T_1$, and $T_2$, respectively. In the image display device 113, an image is displayed so as to be delayed for $T_2$, so that an image generated in 305 is displayed at end timing of frame output time 356, for example. In the frame output time 356, the image display device 113 is notified of a frame rate $F_2$ of the image generated in 305, and therefore able to perform black insertion for $F_2$.

A frequency for OFF and ON of the backlight may be set in accordance with a frame rate at which the image generation unit 112 performs output. For example, in a case of (F, $F_1$, $F_2$)=(60 Hz, 36 Hz, 24 Hz), the frequency for OFF and ON of the backlight may be set to be (120 Hz, 144 Hz, 144 Hz). The frame rate of 24 Hz is a low frequency that is adopted for movies and that human eyes feel smooth, and, when being combined with the standard frame rate of 60 Hz, is able to realize an effective variable frame rate. Moreover, a technique of performing black insertion at 144 Hz into a moving image whose frame rate is 24 Hz has already been established, so that an existing circuit is able to be used without particular expansion. For black insertion at 144 Hz, the frame rate 36 Hz is also able to be used, so that it is possible to realize a more effective variable frame rate. Moreover, human eyes hardly sense a difference between black insertion of 120 Hz and black insertion of 144 Hz, so that it is possible to install black insertion without particular expansion.

<As to Operation of Image Data Output Device 110>

Figure 7:
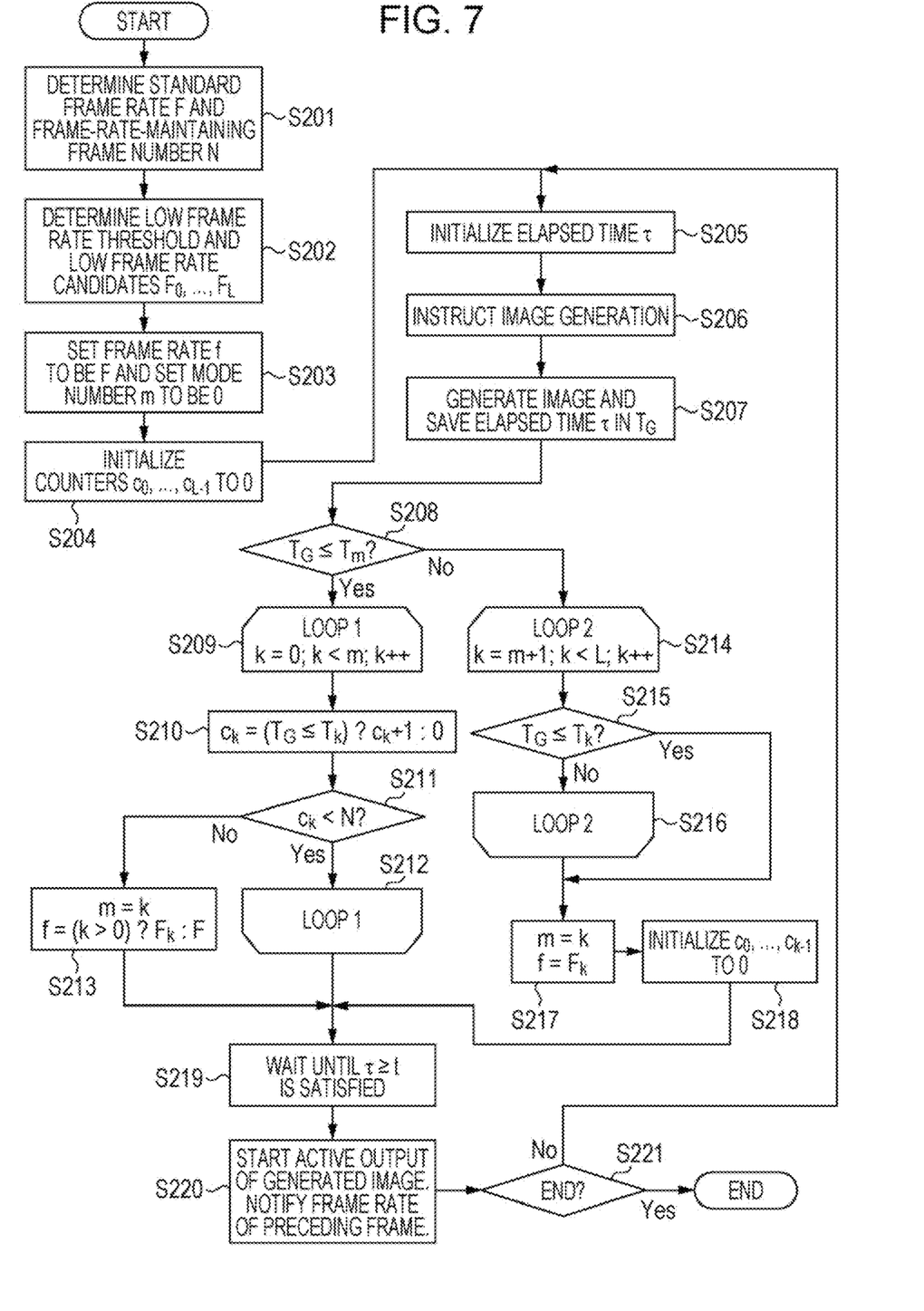
FIG. 7 is a flowchart illustrating an operation of the image data output device in the second embodiment of the invention.

FIG. 7 is a flowchart illustrating an operation of the image data output device 110.

(Step S201) The image data output device 110 acquires information of a maximum refresh rate and the like from the image display device 113. The control unit 111 determines a standard frame rate F on the basis of the acquired information of the maximum refresh rate and the like. Moreover the control unit 111 determines a frame-rate-maintaining frame number N. The control unit 111 outputs F and N to the image generation unit 112. Thereafter, the procedure moves to step S202.

(Step S202) The control unit 111 determines a low frame rate threshold $F_0$ and low frame rate candidates $F_1, \ldots, F_L$. L represents the number of low frame rate candidates. The low frame rate threshold and the low frame rate candidates are set so as to satisfy $F_0 > \ldots > F_L$. The control unit 111 outputs the low frame rate threshold and the low frame rate candidates to the image generation unit 112. Thereafter, the procedure moves to step S203.

(Step S203) The image generation unit 112 sets a frame rate f to be F. In FIG. 4, t represents an inverse number of f. Moreover, the image generation unit 112 sets a mode number m to be 0. Here, the mode number represents which frame rate is used. A mode number 0 represents a standard frame rate mode in which the frame rate f is F. In a case of m>0, the mode number m represents a low frame rate mode in which the frame rate f is $F_m$. Accordingly, a change of the mode number means a change of the frame rate. Thereafter, the procedure moves to step S204.

(Step S204) The image generation unit 112 initializes counters $c_0, \ldots, c_{L-1}$, with which whether or not to change the mode number is judged, to 0. Thereafter, the procedure moves to step S205.

(Step S205) Elapsed time T is initialized. The elapsed time T saves elapsed time from a time point of initialization. Timing of initialization of T and an end of one VBI may be the same. Thereafter, the procedure moves to step S206.

(Step S206) The control unit 111 instructs the image generation unit 112 to generate an image, and outputs a parameter of the image. Thereafter, the procedure moves to step S207.

(Step S207) The image generation unit 112 generates the image on the basis of the parameter of the image obtained at step S206. Moreover, the image generation unit 112 saves elapsed time T of a time point, at which the image generation is finished, in $T_G$. This means that image generation time of a current frame is saved in $T_G$. Calculation of $F_G$ which is an inverse number of $T_G$ may be performed. Thereafter, the procedure moves to step S208.

(Step S208) In a case where the image generation time $T_G$ is equal to or less than $T_m$ which is an inverse number of $F_m$ (in a case where $F_G$ is equal to or more than $F_m$), the image generation unit 112 judges that reduction of the frame rate is not necessary, and the procedure moves to step S209. In a case where the condition is not satisfied, the procedure moves to step S214.

(Step S209) Step S209 is a starting point of a loop structure which ends at step S212. In a case where the preceding step is S208, a variable k is initialized to 0. In a case where the preceding step is S212, the variable k increases by 1. After the aforementioned processing for the variable k is performed, when k is smaller than m, the procedure moves to step S210. In a case where the condition is not satisfied, the procedure jumps to step S212.

(Step S210) In a case where the image generation time $T_G$ is equal to or less than $T_k$ (in a case where $F_G$ is equal to or more than $F_k$), the counter $c_k$ increases by 1. In a case where the condition is not satisfied, $c_k$ is initialized to 0. Thereafter, the procedure moves to step S211.

(Step S211) In a case where the counter $c_k$ is smaller than N, the procedure moves to step S212. In a case where the condition is not satisfied, the procedure moves to step S213.

(Step S212) In a case where the preceding step is S211, the procedure jumps to step S209. In a case where the preceding step is S209, the procedure moves to step S219.

(Step S213) The mode number m is changed to k. In a case where k is larger than 0, the frame rate f is changed to $F_k$. In a case where the condition is not satisfied, the frame rate f is changed to the standard frame rate F. With this step, the frame rate increases. Thereafter, the procedure moves to step S219.

(Step S214) Step S214 is a starting point of a loop structure which ends at step S216. In a case where the preceding step is S208, the variable k is initialized to m+1. In a case where the preceding step is S216, the variable k increases by 1. After the aforementioned processing for the variable k is performed, when k is smaller than L, the procedure moves to step S215. In a case where the condition is not satisfied, the procedure jumps to step S216.

(Step S215) In a case where the image generation time $T_G$ is equal to or less than $T_k$ (in a case where $F_G$ is equal to or more than $F_k$), the procedure moves to step S217. In a case where the condition is not satisfied, the procedure moves to step S216.

(Step S216) In a case where the preceding step is S215, the procedure jumps to step S214. In a case where the preceding step is S214, the procedure moves to step S217.

(Step S217) The mode number m is changed to k. The frame rate f is changed to $F_k$. With this step, the frame rate decreases. Thereafter, the procedure moves to step S218.

(Step S218) The counters $c_0, \ldots, c_{k-1}$ are initialized to 0. Note that, $c_k, \ldots, c_{L-1}$ may be initialized. Thereafter, the procedure moves to step S219.

(Step S219) The image generation unit 112 waits until the elapsed time T becomes t or more, which is the inverse number of the frame rate f. In a case where the condition is satisfied, the image generation unit 112 does not wait. Thereafter, the procedure moves to step S220.

(Step S220) The image generation unit 112 starts active output of the generated image to the image display device 113. The image generation unit 112 notifies the image display device 113 of a frame rate of a preceding frame during frame output time of the image for which active output is started. Note that, a frame rate not of the preceding frame but of a frame several frames before may be notified. Thereafter, the procedure moves to step S221.

(Step S221) End determination of the image data output device 110 is performed. For example, in a case where the image data output device 110 is shut down, it is possible to make a judgment as an end. In a case where judgment is made as the end, the image data output device 110 ends the operation. In a case where judgment is not made as the end, the procedure moves to step S205.

In this manner, according to the present embodiment, the image data output device 110 outputs a frame rate of a generated image. Thereby, the image display device 113 is able to perform black insertion at appropriate timing.

As to black insertion, though a case where the backlight is turned ON after being turned OFF is described, the backlight may be turned OFF after being turned ON. Thereby, it is possible to reduce delay time from image generation to display of the image display device 113.

In a case where a frequency of black insertion (frequency of ON/OFF of the backlight) is changed, the image display device 113 may change brightness of a screen. In order to change the brightness of the screen, the image display device 113 may change data for image display or may change luminance of the backlight. Thereby, it is possible to reduce flicker to be sensed by eyes.

Although a case where the image display device 113 performs black insertion on the basis of a frame rate which is input has been described in the present embodiment, another processing may be performed. In addition to black insertion, a technique of frame interpolation or the like may be used as a technique of improving moving image display performance. The technique of frame interpolation is a technique in which the image display device 113 performs display by further generating an image between frames of image data which has been input. In a case of being able to know a frame rate in advance as described in the present embodiment, by changing the number of images to be generated between frames, it is possible to display a moving image having high quality.

Note that, although a case where a frame rate is instantly switched by setting a VBI to be variable has been described in the aforementioned first and second embodiments, an HBI may be set to be variable. For example, in a case where the image data output device 100 or 110 uses one of the frame rates of 60 Hz and 24 Hz, what is required is only to prepare two HBIs which correspond thereto. For example, in a case where a format in which a pixel frequency is 148.5 MHz, an active width is 1920 pixels, an active height is 1080 lines, and the total number of vertical lines is 1125 is fixed, it is possible to select the total number of horizontal pixels from 2200 and 5500. In a case where the total number of horizontal pixels is 2200, an HBI includes 280 pixels, and a frame rate is 60 Hz. In a case where the total number of horizontal pixels is 5500, an HBI includes 3580 pixels, and a frame rate is 24 Hz. By performing switching between the two HBIs in this manner, it is possible to instantly switch the frame rate between 60 Hz and 24 Hz. Thereby, it is possible to smoothly switch a frame rate without performing processing of changing the total number of horizontal pixels, the total number of vertical lines, the active width, and the active height between the image data output device 100 (110) and the image display device 103 (113) for switching the frame rate. Note that, by setting the pixel frequency to be 148.5/1.001 Hz, it is possible to set a frame rate to be 59.94 (60/1.001) Hz and 23.98 (24/1.001) Hz. Note that, a VBI may be made variable at the same time as an HBI.

A program which runs in the image data output device, the image data output method, the image display device, and the integrated circuit according to the invention is a program that controls a CPU, a GPU, or the like (a program that causes a computer to function) such that the functions in the aforementioned embodiments related to the invention are realized. The pieces of information handled by the devices are temporarily accumulated in a RAM during the processing thereof, and then stored in various ROMs and HDDs, and read, corrected, and written by the CPU or the GPU as necessary. A recording medium that stores the program therein may be any of a semiconductor medium (for example, a ROM, a nonvolatile memory card, or the like), an optical recording medium (for example, a DVD, an MO, an MD, a CD, a BD, or the like), a magnetic recording medium (for example, a magnetic tape, a flexible disc, or the like), and the like. Moreover, there is also a case where, by executing the loaded program, not only the functions of the aforementioned embodiments are realized, but also by performing processing in cooperation with an operating system, other application programs, or the like on the basis of an instruction of the program, the functions of the invention are realized.

When being distributed in the market, the program is able to be stored in a portable recording medium and distributed or be transferred to a server computer connected through a network such as the Internet. In this case, a storage device of the server computer is included in the invention. Moreover, a part or all of the image data output device, the image data output method, the image display device, and the integrated circuit in the aforementioned embodiments may be realized as an LSI which is a typical integrated circuit. Each functional block of the image data output device, the image data output method, the image display device, and the integrated circuit may be individually formed into a chip, or a part or all thereof may be integrated and formed into a chip. In a case where each functional block is made into an integrated circuit, an integrated circuit control unit that controls each integrated circuit is added.

Further, a method for making into an integrated circuit is not limited to the LSI and a dedicated circuit or a versatile processor may be used for realization. Further, in a case where a technique for making into an integrated circuit in place of the LSI appears with advance of a semiconductor technique, an integrated circuit by the technique is able to be used.

Note that, the invention of the present application is not limited to the aforementioned embodiments. The image data output device, the image data output method, the image display device, and the integrated circuit of the invention of the present application is not limited to be applied to a personal computer, a stationary game machine, and the like, and, needless to say, able to be applied to stationary or unmovable electronic equipment which is installed indoors and outdoors such as, for example, AV equipment, kitchen equipment, cleaning/washing equipment, air conditioning equipment, office equipment, an automatic vending machine, other domestic equipment.

As above, the embodiments of the invention has been described in detail with reference to drawings, but specific configurations are not limited to the embodiments, and a design and the like which are not departed from the gist of the invention are also included in the scope of the claims.

INDUSTRIAL APPLICABILITY

The invention is suitably used for an image data output device, an image data output method, an image display device, and an integrated circuit.

This international application claims priority based on Japanese Patent Application No. 2015-001282 filed on Jan. 7, 2015, and the content of Japanese Patent Application No. 2015-001282 is incorporated in this international application.

REFERENCE SIGNS LIST 100, 110 image data output device
101, 111 control unit
102, 112 image generation unit
103, 113 image display device
201, 202, 203, 204, 205, 206, 207, 208, 209, 210, 211, 301, 302, 303, 304, 305, 306, 307 image generation time
250, 251, 252, 253, 254, 255, 256, 257, 258, 259, 260, 261, 351, 352, 353, 354, 355, 356, 357 frame output time
371, 372, 373, 374, 375, 376, 377 image display time

What is claimed is:

1. An image data output device that switches a frame rate of a generated image for each frame and outputs the image to an image display device, the image data output device comprising:
   image generation circuitry that, on a basis of image generation time required to generate the image, changes the frame rate to one of a plurality of frame rates which are predetermined,
   control circuitry that determines a low frame rate threshold on a basis of which the frame rate is switched and a low frame rate candidate that has at least one element, wherein
   the image generation circuitry changes the frame rate to one element of the low frame rate candidate, in a case where an image generation frequency falls below the low frame rate threshold,
   the control circuitry determines the low frame rate threshold and the low frame rate candidate on a basis of numerical information received from the image display device,
   the image generation circuitry notifies the image display device of numerical information indicating current frame rate of the image data output device.

2. The image data output device according to claim 1, wherein
   the image generation circuitry gradually changes the frame rate by spending a prescribed number of frames.

3. The image data output device according to claim 1, wherein
   the image generation circuitry outputs, in a frame in which the frame rate is determined to be reduced, the image immediately after the image is generated.

4. The image data output device according to claim 1, wherein
   the image generation circuitry changes the frame rate to a maximum element of the low frame rate candidate, which does not fall below the image generation frequency.

5. An image data output method of switching a frame rate of a generated image for each frame and outputting the image to an image display device, the image data output method comprising:
   an image generation step of, on a basis of image generation time required to generate the image, changing the frame rate to one of a plurality of frame rates which are predetermined; and a control step of determining a low frame rate threshold on a basis of which the frame rate is switched and a low frame rate candidate that has at least one element, wherein the image generation step changes the frame rate to one element of the low frame rate candidate, in a case where an image generation frequency falls below the low frame rate threshold, the control step determines the low frame rate threshold and the low frame rate candidate on a basis of information received from the image display device, the image generation step notifies the image display device of numerical information indicating current frame rate of the image data output method.

6. An integrated circuit installed in an image data output device that switches a frame rate of a generated image for each frame and outputs the image to an image display device, the integrated circuit comprising:

image generation circuitry that, on a basis of image generation time required to generate the image, changes the frame rate to one of a plurality of frame rates which are predetermined;

control circuitry that determines a low frame rate threshold on a basis of which the frame rate is switched and a low frame rate candidate that has at least one element, wherein the image generation circuitry changes the frame rate to one element of the low frame rate candidate, in a case where an image generation frequency falls below the low frame rate threshold, the control circuitry determines the low frame rate threshold and the low frame rate candidate on a basis of information received from the image display device, the image generation circuitry notifies the image display device of numerical information indicating current frame rate of the image data output device.

\* \* \* \* \*